Inventor:

Siegmund Loewe

Aug. 15, 1961 S. LOEWE 2,996,229

DRIVING MECHANISM FOR MULTI-TRACK MAGNETIC TAPES

Filed June 29, 1956 5 Sheets-Sheet 2

Inventor:

Siegmund Loewe

DRIVING MECHANISM FOR MULTI-TRACK MAGNETIC TAPES

Inventor:
Siegmund Loewe

DRIVING MECHANISM FOR MULTI-TRACK MAGNETIC TAPES

Filed June 29, 1956 5 Sheets-Sheet 4

Inventor
Siegmund Loewe

Inventor:
Siegmund Loewe 2,996,229

DRIVING MECHANISM FOR MULTI-TRACK MAGNETIC TAPES

Siegmund Loewe, 68 Ridge Road, Yonkers 5, N.Y.

Filed June 29, 1956, Ser. No. 595,009
Claims priority, application Germany July 2, 1955
9 Claims. (Cl. 226—50)

The invention refers to a new type of driving mechanism for two or more track magnetic tapes and to a new type of magnetic tape recorders, based on this driving mechanism.

It is the object of the present invention to avoid the difficulties hitherto known relative to magnetic tape recorders, more particularly those using multi-track magnetic tapes.

With reference to apparatus of this kind known up to now, in so far as they operate with a single drive motor, it is necessary in order to be able to trace the second track either to take out the reels at the end of the first track and to turn them or the rotatory direction of the motor has to be changed and, at the same time, the sequence and position of the erasing and recording reproducing magnetic heads have to be altered or others have to be put in their operative position. Both ways cause a loss of time either owing to the necessity of turning the reels or by the motor running down and starting up in the other direction. The following requirements must be fulfilled by a driving mechanism free from such disadvantages:

(1) The turning of the reels must be avoided.

(2) The change in the direction of tape movement must take place in a moment, i.e. in a very short time.

(3) The rotatory direction of the motor must remain unchanged when the tape movement is reversed.

(4) The uniformity in the movement of the tape must fulfill high requirements in both directions.

(5) The device must allow in simple and easy manner the adjustment of various tape speeds in both directions of movement without altering the running of the motor.

The various embodiments of driving mechanisms described in the following permits the fulfillment of these requirements to a high degree and, at the same time, affords some further new advantages.

Figure 1:
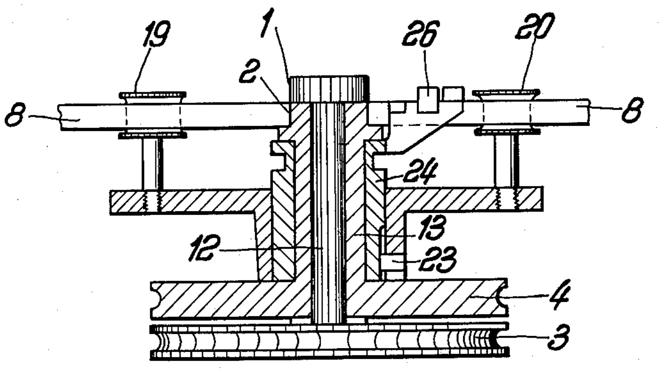
Figure 2:
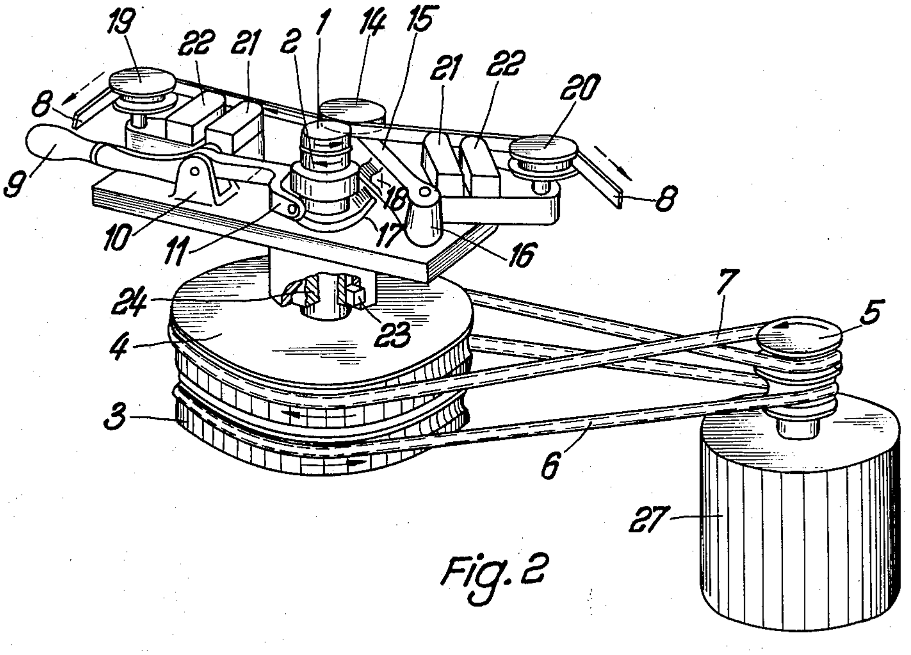
Figure 6:
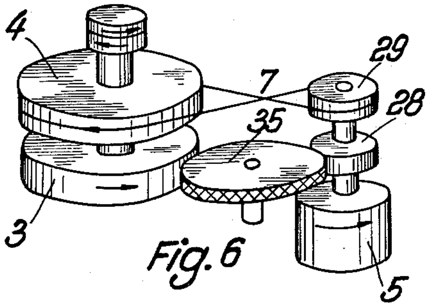
Figure 7:
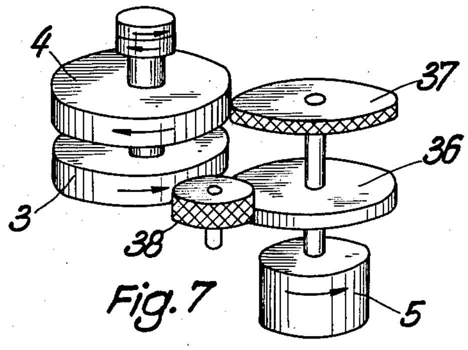
Figure 8:
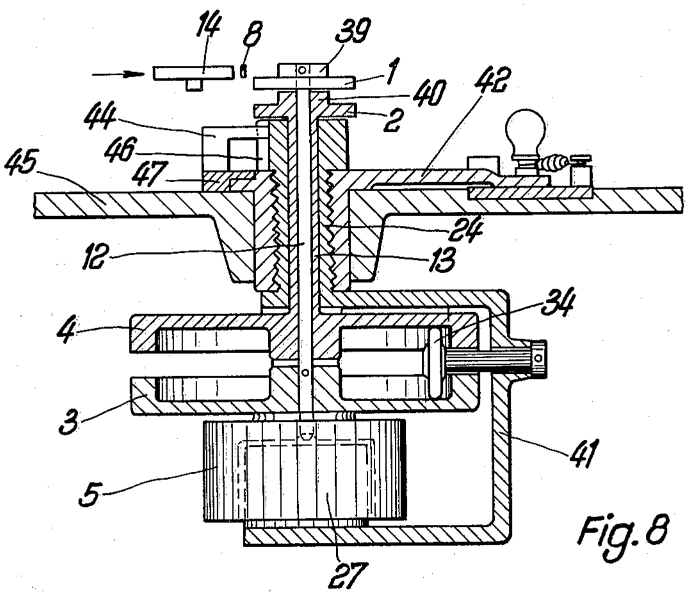
Figure 9:
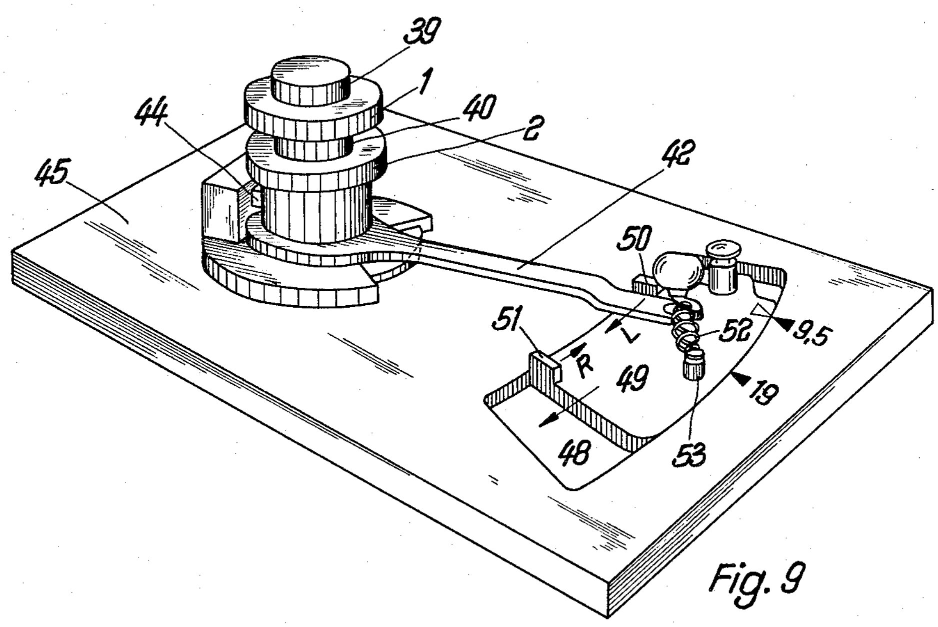
Figures 10, 11, 12:
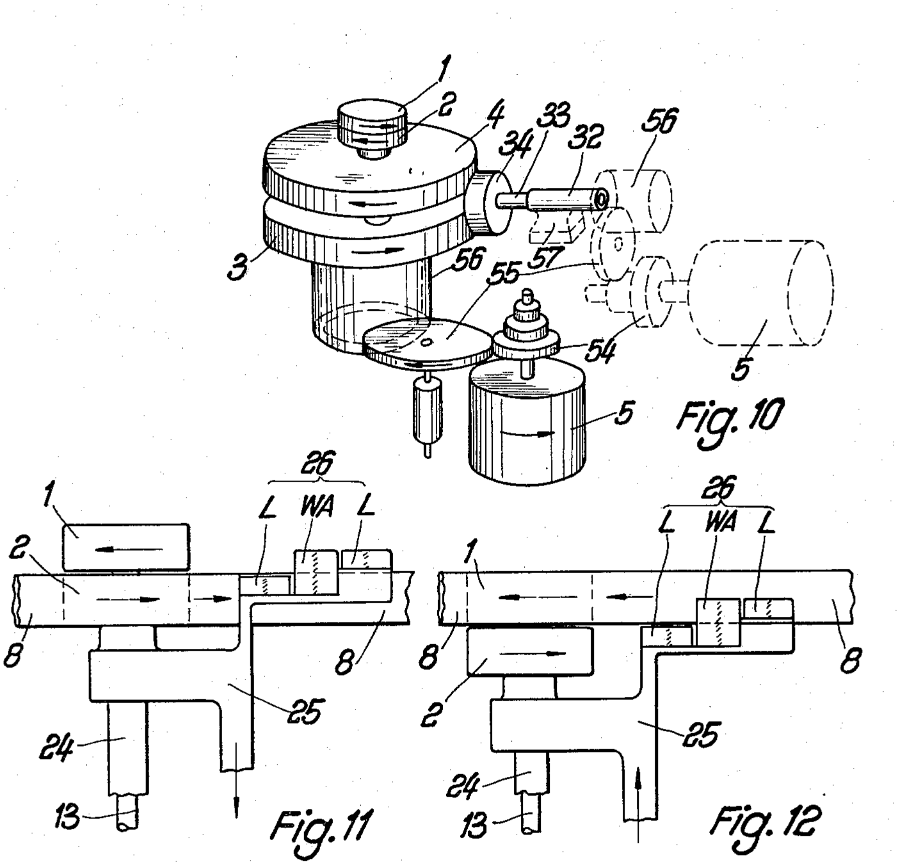
Figure 13:
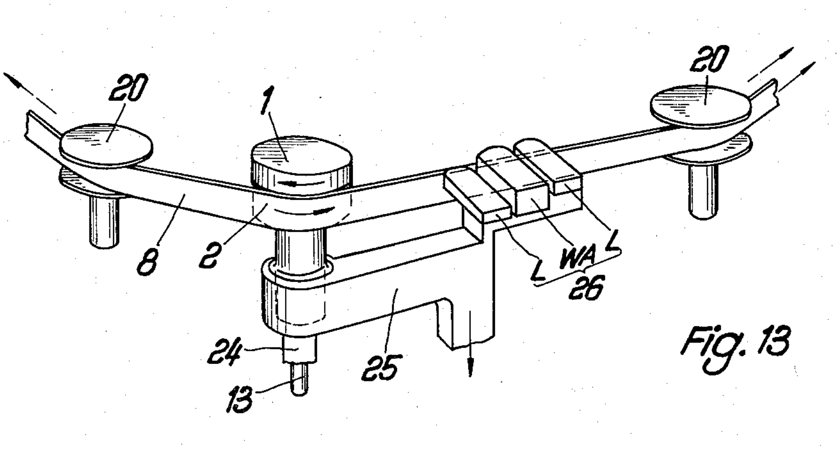
Figure 14:
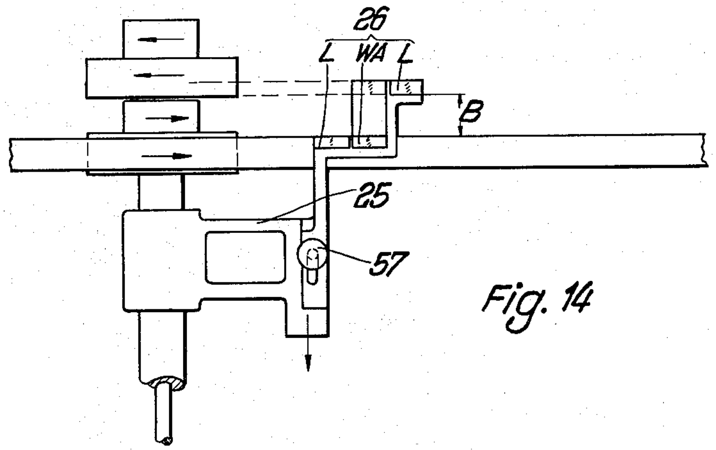
Figure 15:
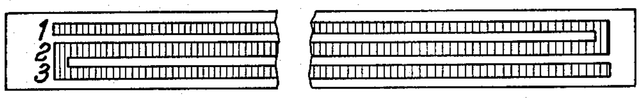
Figure 16:
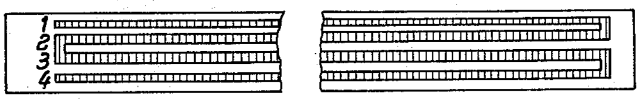
Figure 17:
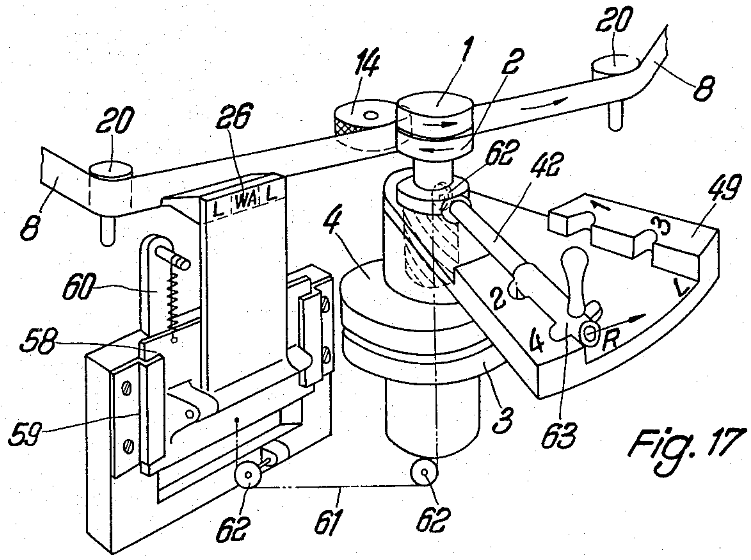

The invention will be better understood by referring to the following description, read in conjunction with the accompanying drawings, forming a part hereof, in which:

FIGURE 1 shows a cross-sectional view of a new type of driving mechanism for the magnetic tape (schematic), FIGURE 2 is a perspective view of the function of this driving mechanism, FIGURES 3 to 7 are various embodiments of connecting the driving element to the motor, FIG. 8 shows a cross-sectional view of a further embodiment of the driving mechanism for two tape speeds, FIG. 9 is a top perspective view of FIG. 8, FIG. 10 shows a further exemplary embodiment of driving mechanism for several tape speeds, FIGS. 11, 12 show a new type of way possible with the described driving mechanisms enabling a nearly continuous tracing and reproduction of two tracks, FIGS. 13 and 14 are similar to FIGS. 11 and 12, however with a further modification in so far as the novel nearly continuous tracing or reproduction of two tracks can be made with various tape speeds, FIG. 15 shows a nearly continuous traced tape, in accordance with the invention, with three tracks (schematic), FIG. 16 is a similar driving mechanism for a tape recording with four tracks, FIG. 17 shows a perspective view of a further development of the mechanisms described for nearly continuous, multi-track recording and reproduction.

Referring to the drawings it is pointed out in detail as follows:

FIG. 1 represents a schematic cross-section through the principal structure of a driving mechanism according to the present invention. It consists in principle of cylindrical drive capstans 1, 2 rotating in opposite directions and arranged in co-axial manner for driving the tape, and being used selectively and alternately for driving the tape in either of two directions.

The drive capstans 1 and 2 are constantly rotating co-axially in opposite directions by being coupled with the pulleys 3 and 4 through direct connection with them. These pulleys 3 and 4 may be designed as flywheels.

As can be seen from FIG. 2, the rotor or shaft 5 of motor 27 drives the pulleys and flywheels 3 and 4 in opposite directions through the belt 6 and the crossed belt 7. FIG. 2 further shows how the movement of tape 8 and its change in direction of the movement is effected. The tape is under a light tension at both ends as shown by the arrows indicated in broken lines. When the rotor 5 of the motor 27 rotates in a counterclockwise direction, then the pulley and flywheel 4 and also the cylindrical capstan 2 rotate in a clockwise direction, while the flywheel 3 and the cylindrical capstan are rotating in counterclockwise direction. Using the same number of rotations and the same diameter of the drive capstans 1 and 2, the tape, in overcoming the light counter force on one of its ends respectively, is moving equally quickly but in either of two opposite directions, in accordance to whether it is pressed by the pinch roll 14 against the capstan 1 or 2. In order to bring the tape in contact with the capstan 1 or 2, rotating in the desired direction, it is possible to raise and lower the tape guide correspondingly. However, without alteration of the tape guide, it is also possible to raise and lower the drive capstans 1, 2 relative to the tape. This way is chosen in the figures serving to explain this invention. By pressing down the lever 9, it is possible with help of the bearing block 10 and connecting piece 11, to raise and lower the whole driving mechanism consisting of the pulleys and flywheels 3 and 4, the concentrical shafts 12 and 13 and the capstans 1 and 2. In either of the operating positions the tape faces one of the two cylindrical capstans respectively and is then pressed by the pinch roll 14 against this facing cylinder roll. During changing over from one direction of movement of the tape 8 to another, the pinch roll 14 is lifted. For this purpose, for example, the roll 14 is mounted on a lever arm 15 operating round the axis 16 under the pressure of a spring in a manner known per se. If the lever arm is pressed down in order to use for driving the tape the other capstan 2 instead of capstan 1—said capstan 2 being situated beneath and running in the opposite direction—then the roll 14 is automatically lifted by the cam 17 during the shifting process of the capstans, said cam being connected to the raising driving mechanism which displaces the shaped piece 18 on lever arm 15 to the right. After the shifting of the drive capstans is finished, the roll 14 is pushed back into its old position by spring effect so that it now presses the tape 8 against capstan 2 running in the opposite direction. The tape 8 is kept under a light tension constantly by the winding or unwinding reels in known manner and passes via the guide rolls 19, 20 along the erasing magnetic heads 21 and the recording-reproducing magnetic heads 22, which are alternately operative according to the movement direction of the tape which is reeled or unreeled to the right or to the left. The purpose and effect of the wedge 23 which permits a lowering of the bushing 24 but not its rotation, and of the head combination 26 borne by arm 25 of the bushing (see FIG. 1) will be later explained. With sufficient length of the belts 6, 7, the course of the motor and the turning of the pulleys or flywheels is not disturbed by the raising or lowering of the driving mechanism described. However, the pulleys 3, 4 can be driven by the motor in another way without interfering with the raising or lowering of the driving mechanism. Various exemplary embodiments of this are shown in FIGURES 3 to 7.

Figure 3:
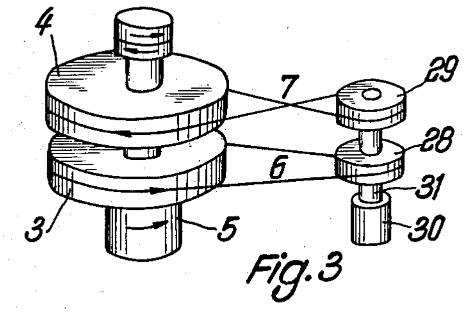

In FIG. 3, the rotor or shaft 5 of the motor 27 (the stator is omitted for reasons of clarity) is connected directly with the flywheel and pulley 3 and forms a part of the same. The drive of the other pulley 4 is performed by means of the straight belt 6 and the crossed belt 7 via pulleys 28, 29 connected with each other and rotating about the shaft 31. The sleeve 30 holds the shaft 31 in its position.

Figure 4:
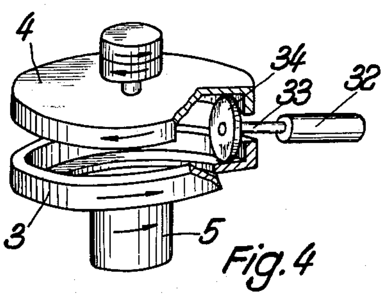

FIG. 4 (see also FIG. 10) is a schematic representation of the various new ways which also form part of this invention and permit the flywheels and pulleys 3, 4, to be driven in opposite directions by means of suitably formed friction discs, raised or lowered with them. The friction wheel 34 is rotatably fitted in the bearing 32 via the shaft 33 and its peripheric outside area is coupled by its oppositely running parts with the interior surfaces of the pulleys 3 and 4. Thus by the friction disc 34 a uniform running of the pulleys 3 and 4 in opposite directions is performed through the motor 5 only, the energy of which is transduced from pulley 3 via friction disc 34 to pulley 4. The bearing 32 is connected to a part of the driving mechanism e.g. to the sleeve 24 (see FIGS. 1 and 2) which is also raised and lowered together with the driving mechanism but is otherwise fixed.

Figure 5:
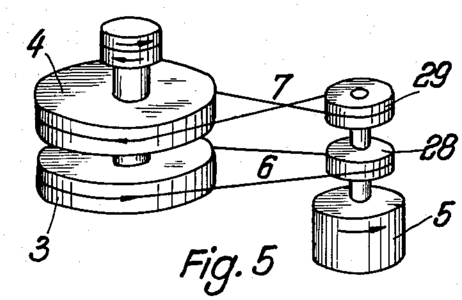

In FIG. 5, the rolls 28, 29 are directly connected with the rotor 5 which itself is fitted in known manner in the stator of the motor. Here, the rotor 5 acts as additional flywheel to avoid irregularities in the running of the rolls, which are coupled by belts 6 and 7 with pulley 3 and pulley 4 respectively.

In FIG. 6 the belt 6 is replaced by a friction disc 35 which can either be raised or lowered as described for the friction disc 34 in connection with FIG. 4, or is fixed tightly. In the first case it slides upwards and downwards on the roll 28, in the latter case on the flywheel and pulley 3.

In FIG. 7, the two belts 6, 7 are replaced by the friction discs 36, 37, 38. This type of drive offers especial advantages of a basic nature (for the uniformity of the tape drive) and in the fabrication. It is desirable to make the form and diameter of the two pulleys 3 and 4 equal. This requires equal diameter of the friction discs 36, 37, driven by rotor 5 of the motor. In order to attain the counter-running of the pulleys and flywheels 3 and 4, the interposition of a friction roll 38 is necessary. When, however, without the use of roll 38, the roll 37 contacts the circumference of the pulley and flywheel 4, then, at the same time, the roll 36 would also contact the circumference of the pulley and flywheel 3 and would therefore also drive in the same direction the pulley and flywheel 4. In accordance with the invention, this defect is avoided, maintaining the above-mentioned advantages in manufacture, as follows:

The friction disc 36 is arranged to be axially displaced in such a way that neither with raising nor lowering of the drive element it contacts the circumference of the flywheel and pulley 3. However, the width of the friction area of the friction disc 38 is so enlarged that it contacts continually the friction disc 36 with a part of its friction area, and with another part it drives the pulley and flywheel 3. In FIG. 7, the friction disc 36 is displaced downwards and the friction area of the friction roll 38 is correspondingly wider. With raising or lowering of the drive mechanism the friction rolls 37, 38 slide on the circumference of the flywheels and pulleys 3 and 4 respectively.

In order to be able to adjust with the driving mechanism described various tape speeds as desired, there are several possible ways: The number of revolutions of the motor can be altered which makes the motor dearer and increases the space occupied by it. Secondly, the circumference of the capstans 1, 2 can be altered leaving unaltered the number of revolutions of the motor and the pulleys and flywheels (FIG. 8). A third way is, with unaltered number of revolutions of the motor and unaltered circumference of the capstans 1, 2, to alter the number of revolutions of the pulleys and flywheels corresponding to the desired tape speed. The simplest way of doing this lies in the known use of a plurality of differently large drive discs between motor and pulleys and flywheels (FIG. 10).

FIGS. 8 and 9 serve to explain the second way: There is used a plurality of drive capstans 1, 2 having different circumferences (diameters) without altering the number of revolutions of the motor and the pulleys and flywheels. In FIG. 8, two pairs of coaxial capstans 1, 2 and 39, 40 of different sizes are shown. The capstans 1 and 39 as well as the capstans 2 and 40 are connected with each other in pairs. The pair 1, 39 is connected via the axis 12 with the flywheel and pulley 3 and the rotor 5. The pair 2, 40 is connected via the hollow axis 13 with the flywheel and pulley 4 and rotates together with the latter in the opposite direction to that of the pair 1, 39. The rotation of the flywheel and pulley 3 is transduced to the pulley and flywheel 4 by means of the friction disc 34 so that the pulley 4 is also rotating with the same uniform velocity as the pulley 3 but in opposite direction. The friction disc 34 is fitted in a yoke, 41 which carries the stator 27 of the motor and encloses the pulleys and flywheels 3, 4. Furthermore the yoke 41 is tightly connected with the sleeve or housing 24. Raising and lowering of this sleeve raise and lower the drive mechanism in relation to the tape 8 and the pinch roll 14. In the lowest position of the drive mechanism shown, the tape 8, visible in the cross-section, is pressed against the smaller roll 39 by moving the pinch roll 14 into the direction of the arrow. By swinging the lever 42 the sleeve 24 supplied with a thread is raised in relation to the fixed outer construction elements and also in relation to the tape and the pinch roll 14. The pitch of the multi-wormed thread on the sleeve 24 and the angle of the swinging of the lever 42 is now so adjusted that, in the new final position of the lever 42, the oppositely running roll 40 faces the tape 8, and the tape after being pressed against this roll 40 by the roll 14 is driven in the opposite direction to its previous movement-direction. In FIG. 9, the swivel lever 42 is seen in a top view in the final position for counter-clockwise running L. If this lever is brought in the other final position R, whereby, as described, the roll 14 is automatically lifted during the movement of the lever, by a known mechanism not shown, then the tape runs with the same speed as previously, however in a clockwise direction.

In order to prevent the sleeve 24 from being turned itself by swinging the lever 42 and to ensure its only raising or lowering, a wedge 44 is connected tightly with the plate 45 and catches a groove 46 of the thread casing 24. The swivel lever 42 fitted rotatable on the plate 45 is held by the retaining ring 47 on the plate.

While in FIG. 1 the driving element was built for only one speed and it had to be displaced by one tape width for changing the direction of the tape movement, it is necessary for operating with two speeds to perform a lifting or lowering of the drive element by two tape widths, for operating with three speeds by three tape widths and so on. However, if the number of desired speeds is once fixed, for example two, then the four cylinder planes of the capstans necessary for such procedure can be so arranged, as FIG. 8 shows, that the same raising or lowering of the drive element effects the desired change in the direction of the tape movement for each of the two speeds. This is an advantage compared to other possible arrangements of the two cylindrical capstan pairs which, for changing the speed, would also require changing lifts for the alteration of direction.

With the described principle of the driving mechanism and the use of the second way mentioned, the alteration of speed as also the alteration of the tape running direction is effected solely by lifting and lowering the capstans.

From FIGS. 8 and 9, it can be seen with what simple means, apart from the reversal of the running direction of the tape just described, an alteration of the tape speed in both directions is possible. In FIG. 9, the point of the arrow shows that a tape speed of 9.5 cm. per second is adjusted. The lever 42 is adjusted to cause counterclockwise running. If this is changed from counterclockwise running to the position R for clockwise running, then it lifts in the manner described the driving system in relation to the tape 8 and the pinch roll 14 by two tape widths, i.e., the roll 40 now faces the tape 8 instead of roll 39. If now, however, it is desired to go over to the larger speed of 19 cm., then the stop 47 is freed and the adjusting disc 49 fitted for example in a hollow 48 of the plate 45, is moved in the direction of the arrow in such a way that the point of the arrow shows on the marking 19. In the new position, the adjusting disc 49 is held by the stop 47 (see FIG. 8). By this, the driving system is raised by a tape width. Tape 8 and roll 14 now face the roll 1 or 2. The lever 42 operates as before between the same limiting stops 50, 51, i.e., it lifts or raises the driving element by two tape widths and thereby effects clockwise or counterclockwise running of the tape with the now adjusted speed of 19 cm. per second. The lever 42 is held by the spring 52 in the final position, to the right or to the left. The pressure spring 52 affects, on the one side, the lever 42 and is connected with its other end to the bolt 53 which is joined to the adjusting disc 49.

In the same way, it is quite possible, instead of two speeds to provide three or more speeds.

The third way mentioned for altering the speed of the tape movement is represented in FIG. 10. Here, the rotor 5 drives via the stepped disc 54 and the friction wheel 55 the cylinder 56 which is tightly connected to the pulley and flywheel 3. Further 34 designates the friction wheel used for driving the pulley and flywheel 4. In this case the wheel 34 is not arranged within the two pulleys and flywheels but is in contact with opposite running parts of the circumference of these pulleys. In FIG. 10, the alteration of speed in the movement of the tape is carried out by the stepped disc 54. The friction disc 55 rotates at different speeds according to the diameter of the used stage of the disc 54 which is contacted. It transmits via the cylinder 56 its respective speed to the pulley and flywheel 3 which, in turn, drives via the friction disc 34 the pulley and flywheel 4 at an equal speed in the opposite direction. With this manner of speed alteration, the capstans 1, 2 have only to alter the running direction of the tape. With such a device, it is not necessary to provide a movable adjustment disc 49 (see FIG. 9). It is quite sufficient to make the lever 42 movable between the limiting stops 50, 51 tightly fixed on the plate.

In FIG. 10, another kind of arrangement of the rotor 5 is shown in broken lines with the stepped disc 56. With this arrangement, the drive of the two pulleys and flywheels 3 and 4 is performed directly by the friction wheel 34. The cylinder 56 is not connected with the pulley and flywheel 3, but drives via the shaft 33 the friction disc 34. The bearing 32 of the shaft 33 is connected via the block 57 with a part of the set which takes part in the raising and lowering of the driving element but does not turn. The friction disc 55 is kept, under spring pressure, constantly in contact as well with the cylinder 56 as also with one of the stages 54 (according to choice of speed). The shaft of the friction disc 55 is arranged in parallel to the shaft of the stepped disc. The friction disc 55 can be moved on this shaft in order to place it opposite the speed stage respectively desired. At the same time, the shaft permits an arc movement concentric to the shaft of the stepped disc so that, under the effect of spring tension, the friction disc 55 can be continually kept in contact with the cylinder 56 and with the respective speed stage desired. This arrangement has advantages for the operation as well as for the fabrication.

The driving element described makes possible a new way to multi-track tracing and reproduction of recordings on magnetic tapes, which may be designated with the expression "quasi-continuous," i.e., nearly continuous. This new way is made possible in that the changing over from one running direction of the tape to the other requires only the fraction of a second so that the interruption of the recording or play-back does not at all take place or is only unnoticeable. As explained, the driving system permits a reversal of the running direction of the tape without the least alteration to any running of the turning parts. The driving system is only raised or lowered.

Furthermore, it is explained, on the basis of FIGS. 11, 12, 13 and 14 that for two track, the so-called "quasi-continuous" recording or play-back an arrangement of the erasing heads L and reproduction heads WA (designated together by 26) is possible which permits, with change of direction of the tape, the avoidance of any changing over of the recording heads. Recording and reproduction may be continued without interruption before, during and after the change in direction. This is made possible in that the heads 26 are fastened by means of an arm 25 to one part of the driving element taking part in the raising and lowering. The WA-head of the combination 26 has a double gap width or consists of two identical single heads arranged on top of each other, each of which has the necessary gap-width for one track recording.

FIG. 13 shows such an arrangement in perspective. The tape 8 moves from the left to the right and the head combination 26 is switched to recording. Now, in accordance with the invention, both erasing heads L are fed with the erasing high frequency while the recording head is supplied as well with the high frequency magnetization as with the low frequency recording voltage. The left erasing head L erases on the top track of the tape all recordings made thereon. Then the lower gap part of the recording head WA traces the new recording. The right erasing head L, also carrying high frequency, cannot, however, erase the recording since, as can be seen from FIGS. 11 and 13, it stands above the tape and thus its erasing field does not operate on the recorded tracks. If now the arm 25 is moved downwards in the direction of the arrows in FIGS. 11 and 13, which can take place in the fraction of a second, then the reversal of the direction of the tape, shown in FIG. 12 and simultaneously the new position of the heads occurs. Now the right erasing head L of the combination 26 operates first on the track which is continued within a moment in the opposite direction of the tape running, while the top gap of the recording-reproduction head continues in performing the running recording.

Correspondingly in case of play-back, the erasing high frequency and high frequency excitation of the reproducing-recording head is switched off, and the amplifier is switched on to the reproducing head. With the tape running to the right as in FIG. 11, the top track is first played back. At the end of the top track, the driving element is lowered in a moment by a tape width together with the head combination 26, whereby the direction of the tape running is reversed and, at the same time, the top gap part of the reproducing-recording head continues the running play-back process.

FIG. 14 shows that such a so-called "quasi-continuous" two track recording can also be used with a driving element according to FIG. 8, i.e. with several speeds. If, e.g. as in FIG. 14, two speeds are provided, then the erasing and reproducing-recording heads for the top track are arranged on the arm 25, said heads being separated by a tape width from the erasing and reproducing-recording head for the lower tape track. When a change is made to another speed, the clamp 57 is loosened and the total head combination is moved once by a tape width in relation to the arm 25. Now the so-called "quasi-continuous" recording with the altered tape speed is possible, in the manner described above, with a second speed.

These observations lead to a new and important extension of the recording and reproducing possibilities with magnetic tapes which are not endless. Such non-endless magnetic tapes, provided with multi-track recordings, are shown in FIGS. 15 and 16 wherein FIG. 15 shows a three track and FIG. 16 a four track "quasi-continuous" recording. As can be seen, the recording of the track 1 begins at the left side of the tape at the top and ends at the right below on the track 3. A similar recording using four tracks is shown by FIG. 16, where the fourth track ends exactly below the commencement of the first track. The arrangement according to FIG. 16 permits by quick back movement of the head combination on attaining the end of the fourth track to the commencement of the first track a continuous, practically uninterrupted repetition of the recording traced in four tracks on the tape. If more than two tracks and/or more than one speed is to be traced on the tape, then the head combination 26 is not rigidly connected to the driving system so that it must take part in the raising and lowering of the driving element. It is useful to co-ordinate it with the movements of the driving system and to make the absolute amount of raising or lowering of the head combination adjustable separately.

FIG. 17 shows how this may be performed. The swivel lever 42 raises and lowers in the manner explained the driving system in such a way that alternately the clockwise and counterclockwise running of the band is effected. However, at the same time, it enforces that e.g. all odd tracks are recorded during counter-clockwise running of the tape and all even tracks during clockwise running of the tape. This takes place in the following manner:

The head combination 26 moves in a slot guide 58, 59 transversely to the tape upwards and downwards. The upward movement results from the tension of the spring 60, the downwards movement from the tension of a wire rope 61, fastened to the plate 58 and led via rolls 62 along the axis of the tube-shaped lever 42, as shown, and fastened to a sleeve 63, which is movably mounted on the lever. This sleeve 63 permits, on the one hand, the swinging of the lever in the end position marked with R and L which as explained on the basis of FIG. 9 determine the running direction of the tape. The indicator disc 49 now clearly shows that the even tracks can be adjusted only with clockwise running, the odd only with counter-clockwise running. At the same time, however, the disc 49 prescribes how far the sleeve 63 must be pulled out or pushed in along the tube-shaped swivel lever 42, in order to adjust the track in question. In this way, the position of the head combination 26 is clearly co-ordinated with the tracks of the even or odd numbers. Automatically with the change over of the lever 42, the right of left head is switched in for recordings at the same time depending on which of the two erasing heads precedes the respective recording head.

The invention shows a new way in order to make the so-called "quasi-continuous" recordings on the usual 6 mm wide tape and makes possible recordings and playbacks lasting many hours.

Multi-track, so-called "quasi-continuous" recordings on normal non-endless tapes, are new per se and are not dependent on the use of the driving element described. They may also be produced by use of other types of drive.

As mentioned the pinch roll 14 can be lifted automatically or by hand by axial movement, i.e. by raising or lowering the driving mechanism. So long as, however, the alteration in the running direction of the tape or also the alteration of the speed or both is performed by use of oppositely running cylindrical capstans of the same diameter, a lifting of the pinch roll and of the tape from the driving capstan is not necessary, if the alteration takes place by turning of the driving element. This is an especial advantage of the device described.

What I claim is:

1. A driving mechanism for magnetic tape recorders comprising a tape, a pair of counterrotating drive rolls for driving the tape in either of two opposite directions, a pair of counterrotating pulleys, a pair of coaxially arranged shafts, a motor shaft for driving said pulleys, and coupling means between said motor shaft and said pulleys, each of said counterrotating rolls for driving the tape being directly connected by one of said coaxially arranged shafts with one of said counterrotating pulleys, each of said pulleys being constructed to act as flywheel, said coupling means being formed by friction discs, the width of said pulleys in axial direction being large enough to enable a permanent coupling effect between said pulleys and said motor shaft also during shifting of said pulleys transversely to the tape.

2. A driving mechanism for magnetic tape recorders comprising a tape, a pair of counterrotating drive rolls for driving the tape in either of two opposite directions, a pair of counterrotating pulleys, a pair of coaxially arranged shafts, a motor shaft for driving said pulleys, and coupling means between said motor shaft and said pulleys, each of said counterrotating rolls for driving the tape being directly connected by one of said coaxially arranged shafts with one of said counterrotating pulleys, said motor shaft running always in one direction and being permanently coupled by said coupling means to said pulleys for driving them permanently in opposite directions, said coupling means consisting of one friction disc which engages said pulleys with opposite parts of its circumference.

3. A driving mechanism for magnetic tape recorders comprising a tape, a pair of counterrotating drive rolls for driving the tape in either of two opposite directions, a pair of counterrotating pulleys, a pair of coaxially arranged shafts, a motor shaft for driving said pulleys, a pinch roll for pressing the tape against either of said rolls, and coupling means between said motor shaft and said pulleys, each of said counterrotating rolls for driving the tape being directly connected by one of said coaxially arranged shafts with one of said counterrotating pulleys, said motor shaft being permanently coupled by said coupling means to said pulleys for driving them permanently in opposite directions, said pinch roll and said tape being shiftably arranged for enabling selectively pressing said tape against either of said rolls, said pair of counterrotating drive rolls consisting of a pair of stepped rolls, the various steps of which enable various tape speeds by pressing the tape against one of the various steps of said rolls by means of said pinch roll.

4. A driving mechanism for magnetic tape recorders comprising a tape, a pair of counterrotating drive rolls for driving the tape in either of two opposite directions, a pair of counterrotating pulleys, a pair of coaxially arranged shafts, a motor shaft for driving said pulleys, and coupling means between said motor shaft and said pulleys, each of said counterrotating rolls for driving the tape being directly connected by one of said coaxially arranged shafts with one of said counterrotating pulleys, said motor shaft running always in one direction and being permanently coupled by said coupling means to said pulleys for driving them permanently in opposite directions, said coupling means containing at least one stepped roll tightly arranged on the driving motor shaft, the various steps of said stepped roll enabling various driving speeds for said pulleys and rolls by selectively coupling the various steps of the roll with said pulleys.

5. A driving mechanism for magnetic tape recorders comprising a tape, a pair of counterrotating synchronous drive rolls for synchronously driving the tape by friction effect alternately in either of two opposite directions, a pair of counterrotating pulleys, a motor for driving said pulleys, a pinch roll for alternately pressing the tape against either of said drive rolls, and coupling means between said motor and said pulleys, each of said counterrotating drive rolls for synchronously driving the tape being directly connected by coaxially arranged shafts with one of said counterrotating pulleys, only one of said drive rolls alternately engaging the tape by means of said pinch roll.

6. A driving mechanism for magnetic tape recorders comprising a tape, a pair of counterrotating synchronous drive rolls for synchronously driving the tape by friction effect alternately in either of two opposite directions, a pair of counterrotating pulleys, a motor for driving said pulleys, a pinch roll for alternately pressing the tape against either of said drive rolls, and coupling means between said motor and said pulleys, each of said counterrotating drive rolls for synchronously driving the tape being directly connected by coaxially arranged shafts with one of said counterrotating pulleys, only one of said drive rolls alternately engaging the tape by means of said pinch roll, each of said pulleys being constructed to act as flywheel.

7. A driving mechanism for magnetic tape recorders comprising a tape, a pair of counterrotating synchronous drive rolls for synchronously driving the tape by friction effect alternately in either of two opposite directions, a pair of counterrotating pulleys, a motor for driving said pulleys, a pinch roll for alternately pressing the tape against either of said drive rolls, and coupling means between said motor and said pulleys, each of said counterrotating drive rolls for synchronously driving the tape being directly connected by coaxially arranged shafts with one of said counterrotating pulleys, only one of said drive rolls alternately engaging the tape by means of said pinch roll, said motor running always in one direction and being permanently coupled by said coupling means to said pulleys for driving them permanently in opposite directions.

8. A driving mechanism for magnetic tape recorders comprising a tape, a pair of counterrotating synchronous drive rolls for synchronously driving the tape by friction effect alternately in either of two opposite directions, a pair of counterrotating pulleys, a motor for driving said pulleys, a pinch roll for alternately pressing the tape against either of said drive rolls, and coupling means between said motor and said pulleys, each of said counterrotating driver rolls for synchronously driving the tape being directly connected by coaxially arranged shafts with one of said counterrotating pulleys, only one of said drive rolls alternately engaging the tape by means of said pinch roll, said motor running always in one direction and being permanently coupled by said coupling means to said pulleys for driving them permanently in opposite directions, said pairs of counterrotating pulleys and drive rolls forming one driving unit and being shiftably arranged transversely to the tape.

9. A driving mechanism for magnetic tape recorders comprising a tape, a pair of counterrotating synchronous drive rolls for synchronously driving the tape by friction effect, alternately in either of two opposite directions, a pair of counterrotating pulleys, a motor shaft for driving said pulleys, a pinch roll for alternately pressing the tape against either of said drive rolls, and coupling means between said motor and said pulleys, each of said counterrotating drive rolls for synchronously driving the tape being directly connected by coaxially arranged shafts with one of said counterrotating pulleys, only one of said drive rolls alternately engaging the tape by means of said pinch roll, each of said pulleys being constructed to act as flywheel, said coupling means being formed by two belts, one of which is connecting one of said pulleys and said motor shaft in direct form, and the other of which is connecting the other of said pulleys and said motor shaft in crossed form.

References Cited in the file of this patent

UNITED STATES PATENTS

| | | |
|---|---|---|
| 2,504,587 | Rey | Apr. 18, 1950 |
| 2,568,601 | Anderson | Sept. 18, 1951 |
| 2,632,059 | Camras | Mar. 17, 1953 |
| 2,673,041 | Hittle | Mar. 23, 1954 |
| 2,732,144 | Jones | Jan. 24, 1956 |